Patented Oct. 3, 1922.

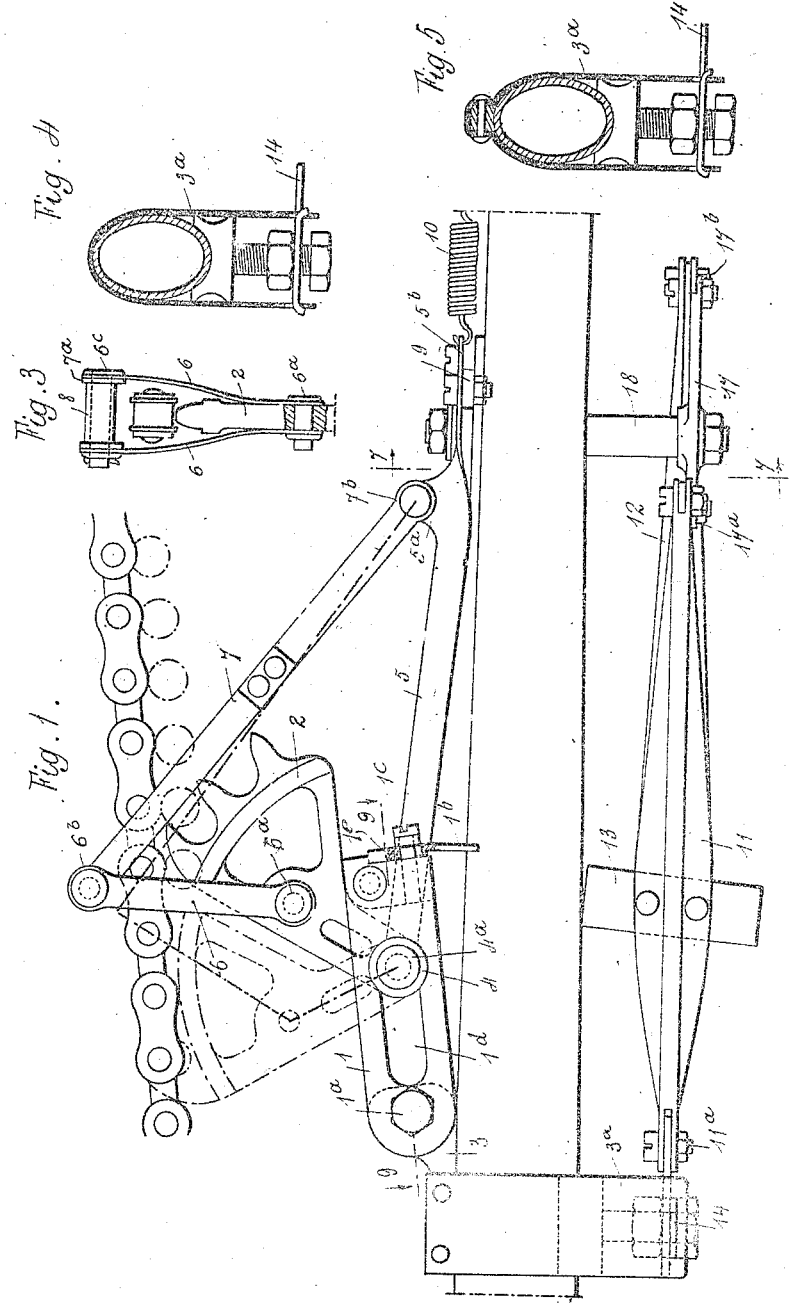

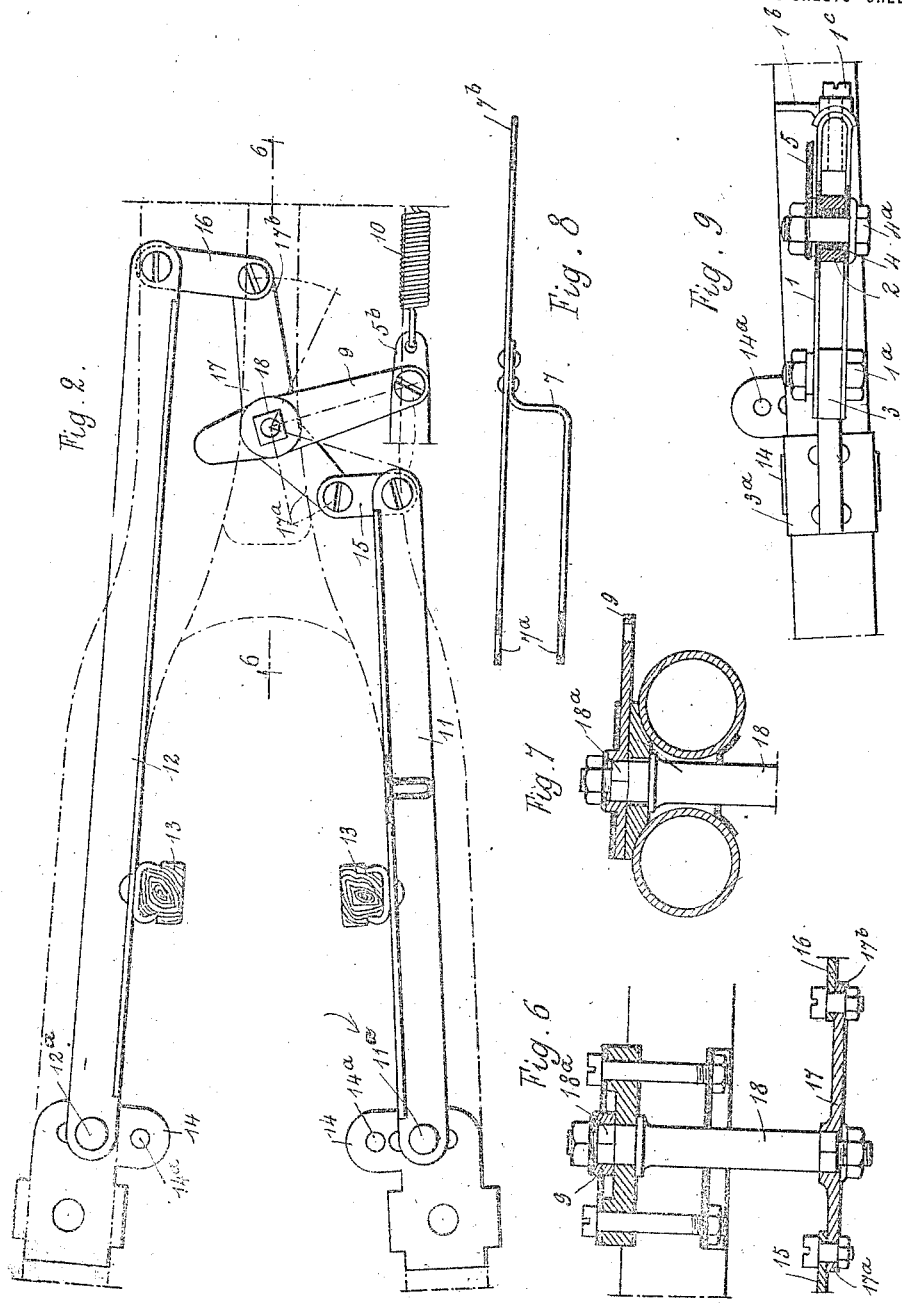

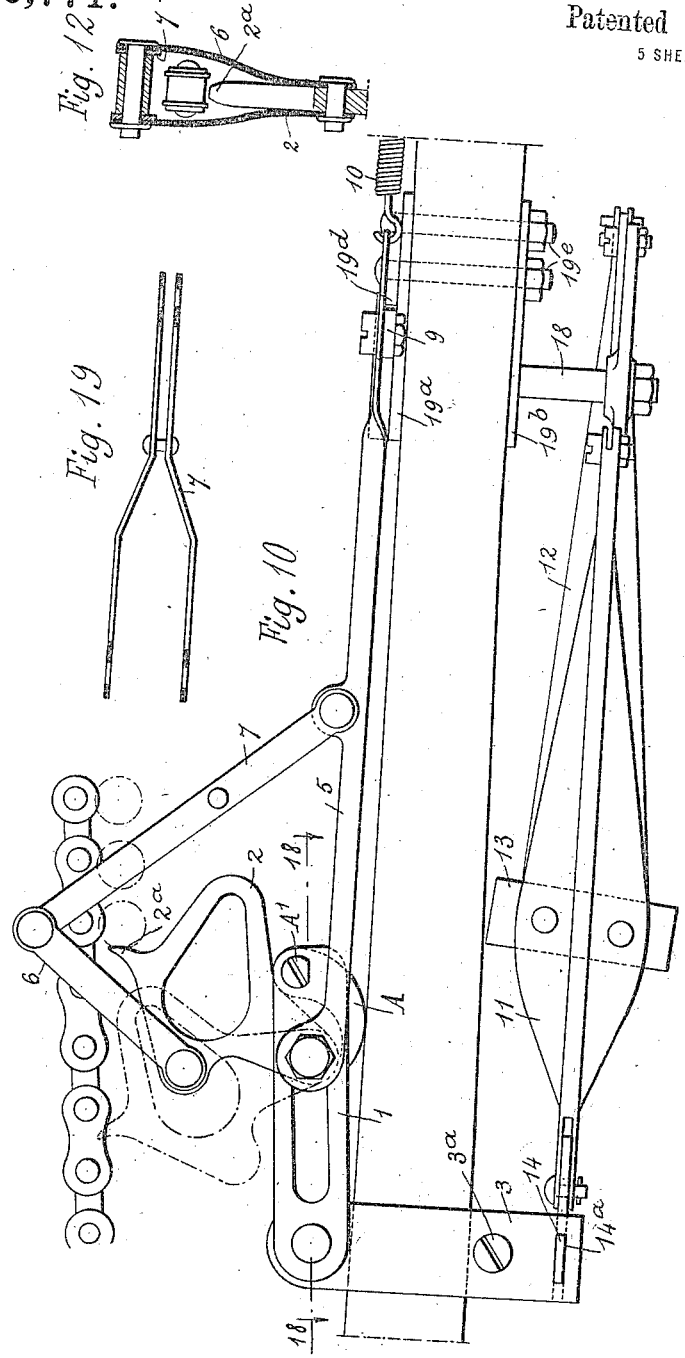

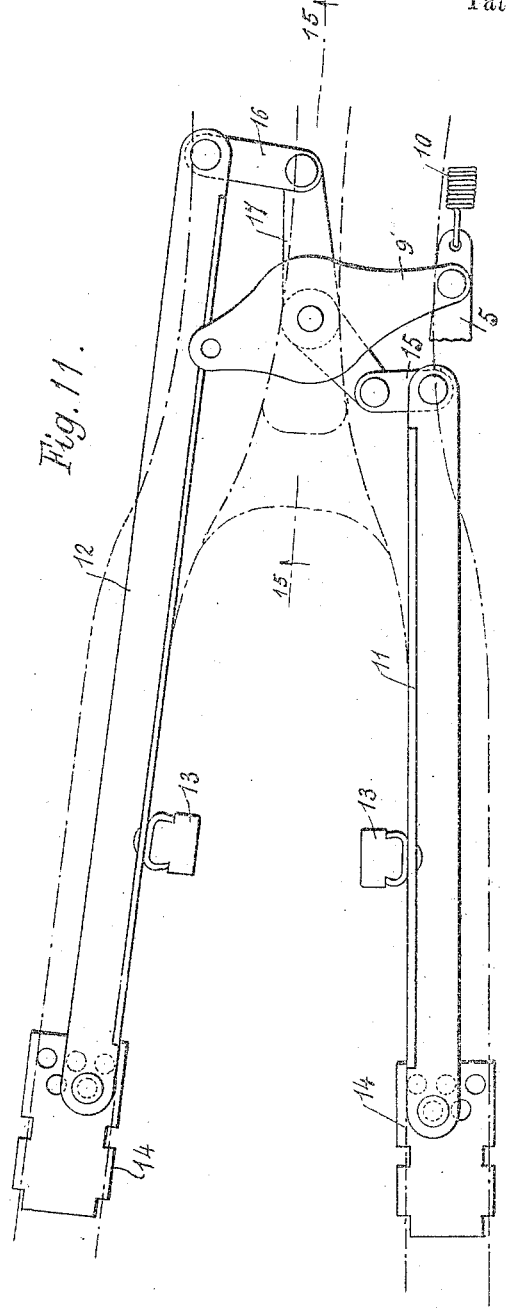

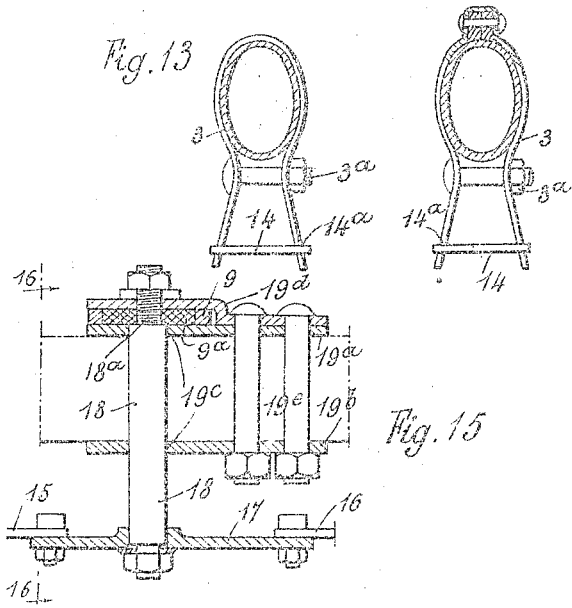
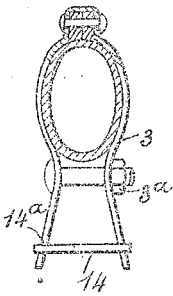
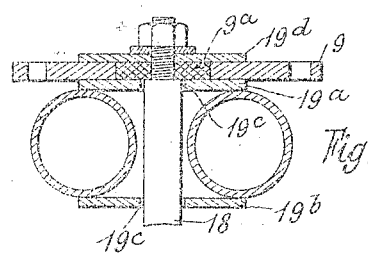
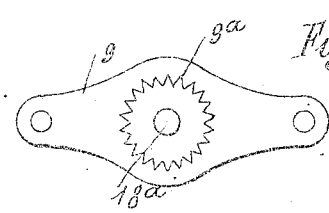
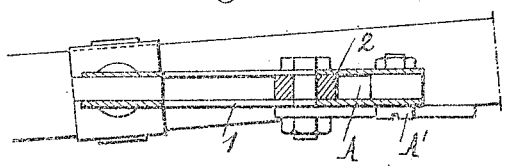

1,430,771

UNITED STATES PATENT OFFICE.

PIERRE TOUCHAIS AND CHARLES WAHL, OF PARIS, FRANCE.

BRAKE FOR CYCLES.

Application filed June 11, 1919. Serial No. 303,521.

*To all whom it may concern:*

Be it known that we, PIERRE TOUCHAIS and CHARLES WAHL, both citizens of the French Republic, residing at Paris, in the Department of Seine, the French Republic, have invented new and useful Improvements in Brakes for Cycles, of which the following is a specification.

The present invention relates to brakes for cycles which are operated by the chain when the pedals and cranks are forced in the opposite direction to the normal running of the machine. During the forward movement of the machine, the pedals turn in clockwise direction, the top side of the chain being therefore under tension and therefore in a rectilinear direction.

By pressing on the pedals in the reverse direction, the normal play which is allowed to the chain, will permit the upper portion of the chain, owing to its weight, to sag and take the form of a curve, the chain will have therefore slightly dropped, its maximum drop being approximately near to the half-way distance between the axis of the pedal axle bracket and that of the rear wheel. The principle of the braking action of this invention is based upon the sufficient drop or lowering of the chain within the minimum play allowed thereto.

In the drawings:—

Figure 1 is an elevation of the brake; Fig. 2 shows the jaws of the brake; Figs. 3, 4 and 5 are sections of details; Fig. 6 is a section on line 6—6 of Fig. 2; Fig. 7 is a section on line 7—7 of Fig. 1; Fig. 8 is a plan view of the operating crank; Fig. 9 is a section on the line 9—9 of Fig. 1; Fig. 10 is an elevation of a modified form of construction; Fig. 11 is a plan of same; Figs. 12, 13 and 14 show details; Fig. 15 is a section on line 15—15 of Figure 11; Fig. 16 is a section on the line 16—16 of Fig. 15; Fig. 17 is a plan view of the control lever; Fig. 18 is a section on the line 18—18 of Fig. 10; Fig. 19 is a plan view of the control or operating crank.

Reference character 1 represents a slotted member in which oscillates and slides the toothed sector 2; the slotted member 1 which is disposed in the vertical plane of the chain, is secured by a bolt $1^a$ to a support 3. The slotted member can oscillate and take variable inclined positions (its action causing the inclination of the chain to vary) but always remaining parallel to the chain. This position is ensured by the intermediary of the member $1^b$ which allows of the adjustment of the slotted member 1. The member $1^b$ is held in position by means of a screw $1^c$. Said screw passes through an adjustment slot $1^e$ with which the member $1^b$ is provided.

The toothed sector 2 oscillates freely around the ring 4 which is guided in a groove $1^d$ in the slotted member by a bolt $4^a$ to which is secured the control arm or crank 5.

On the toothed sector 2 are mounted two bifurcated arms 6 free to turn about an axis $6^a$, and whose extremities $6^b$ receive a spindle $6^c$ serving as connections for the ends $7^a$ of the lever 7. The fork is kept distanced from the lever 7 by means of a roller 8.

The extremity $7^b$ of the arm or lever 7 is fitted to a lug $5^a$ provided on the arm 5 where it can pivot freely. At the extremity $5^b$ of the arm 5 is connected firstly the operating lever 9 and secondly the return spring 10 which latter serves the purpose of returning the parts to their normal position of rest.

Lever 9 is fitted on a spindle 18 by means of a square $18^a$ (Fig. 6) the other end of which receives the lever 17 which is similarly secured to the spindle 18 by means of a square. The two ends $17^a$ and $17^b$ of lever 17 receive the arms 15 and 16 which are also connected to the brake-block arms 11, 12 of unequal length upon which are fixed permanently the shoes 13.

The carriers 11, 12 oscillate freely on the axes $11^a$ and $12^a$ provided on the members 14, and the distance between the brake-shoes can be adjusted by displacing the pins $11^a$ and $12^a$ in the holes $14^a$ provided for the purpose in the members 14.

The members 14 are formed in one with the supports $3^a$ which hold the brake and the controlling means to the cycle frame.

Figure 1 of the accompanying drawings which represents the forward movement, shows that the chain being stretched does not touch any of the surrounding members and that if at times it should sag, it would slip on the teeth of the toothed sector 2.

The actuating or engaging mechanism is therefore completely independent of the chain during the forward movement. If on the contrary, the movement of the pedals is reversed, the upper portion of the chain sags and in its retrograde movement it will carry with it the toothed sector 2 which, offering no resistance, will oscillate and take up the position represented in dot and dash lines in Fig. 1.

It will be readily understood that at this moment the roller 8 mounted on the pin 6ᶜ, will press all the more tightly upon the chain the more pressure is applied to said roller, and that the toothed sector will not go further along. Therefore, in continuing the action on the pedals, the whole will be drawn rearwards with the chain, and arm 5 will then act upon the lever 9 which rotates the lever 17 through the intervention of the spindle 18.

In its pivotal movement, the lever 17, through the intervention of the links 15, 16, operates the brake shoe-carriers 11, 12 which take up the position for braking; the braking action will be the more effective according to effort exerted on the pedals and this without causing any appreciable fatigue.

When the forward movement of the pedals is resumed, the chain returns the toothed sector to its original position while the spring 10 withdraws the brake blocks to their normal free position. If the chain is of the reinforced roller type it is desirable to slightly round off the edges of the teeth of the toothed sector, this with the sole object of causing them to engage more readily with the successive rollers of the chain so as to slip into the next link.

Figs. 10 to 19 show a modification in the construction of the brake and in which the toothed sector only has a single engaging tooth, the adjustment of the height being effected by means of a cam whose evolution is a circle, thereby allowing the sector to be raised or lowered to suit the different diameters of the wheels and pinions. The sector can engage with any kind of chain immaterial of the pitch or size by reason of its tooth.

The various members of this construction are similar to those described above except that the operating lever instead of being fitted on a square is made integral with the shaft by means of a toothed washer which allows a perfect adjustment.

The sector 2 is fitted with a tooth 2ᵃ which can mesh with the rollers of the chain no matter what may be the pitch thereof, the result obtained being the same as in case of the toothed sector described with reference to Figure 1.

The sector 2 is connected as shown in the preceding example by an arm 6 to the bifurcated arm 7 which is slightly modified as shown in Fig. 19 in order that the pull may take place in axis of the chain.

The operating lever 9 is attached to the pin 18 by means of a toothed washer 9ᵃ whose teeth engage with corresponding teeth provided for the purpose in the lever 9.

The washer 9ᵃ is screwed on to a threaded portion 18ᵃ at the extremity of the pin 18. This manner of mounting enables the operating lever to be exactly regulated since by simply displacing by one tooth in either the one or the other direction, the angle of the operating lever 9 can be altered in relation to the lever operating the brake-shoe carrier-arms.

The pin 18 is secured to the bicycle frame in the present form of construction by plates 19ᵃ, 19ᵇ through which the pin 18 passes by holes 19ᶜ; on the plate 19ᵃ rests the lever 9 which is held in place by a plate 19ᵈ of appropriate form. The three plates 19ᵃ, 19ᵇ, and 19ᵈ are secured to the frame of the cycle by means of bolts 19ᵉ.

The carrier arms 11, 12 are articulated to the members 14 as above stated, these members being held in the apertures 14ᵃ arranged in the supports 3 which latter are connected to the frame tubes by a simple tightening bolt 3ᵃ.

We claim:—

1. In a brake for free wheel bicycles and the like, an operating member consisting of a gear sector to be engaged by the links of the driving chain when back pedaling, arms on the said sector, means on said arms to engage the said chain and to lock the same to the sector by the rotation of the sector, means to produce thereby a longitudinal displacement of the sector, and means to move the brake shoes into braking position by the said longitudinal displacement, substantially as described.

2. A cycle-brake actuated by the driving chain, characterized by an operating member consisting of a toothed sector which meshes with the chain when the pedals are reversed, a slotted member, a pin engaging in the slot thereof and serving as a pivot for the toothed sector, regulating means for the slotted member and comprising an arm secured to the extremity thereof, articulated lever arms pressing on the chain, an arm, a control lever actuated thereby, a brake lever movable by said control lever, and a return spring for said elements.

3. A cycle-brake actuated by the driving chain, characterized by an operating member consisting of a toothed sector which meshes with the chain when the pedals are reversed, arms depressed by the pivotal movement of said sector, and brake shoe carrying levers operated by said arms when the latter are depressed, said levers being pivotally mounted and adjustable toward and from each other.

PIERRE TOUCHAIS.
CHARLES WAHL.